June 30, 1970   W. C. KESLER ET AL   3,517,848
FOIL CLOSURE FOR PLASTIC CONTAINERS
Filed April 17, 1968   3 Sheets-Sheet 1

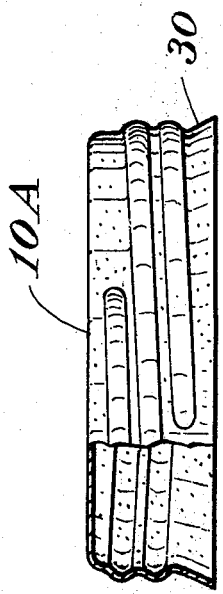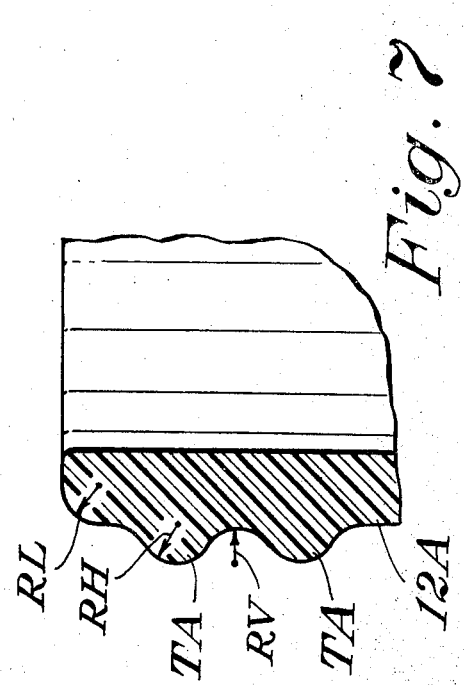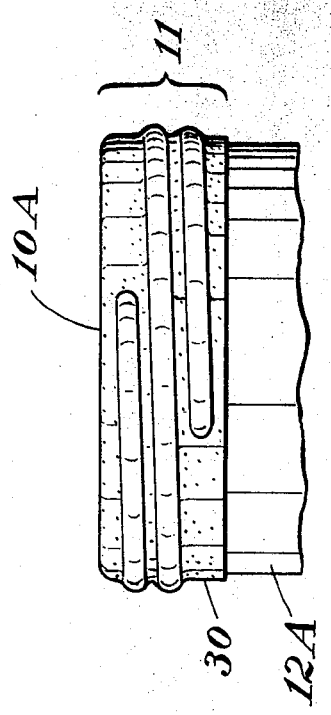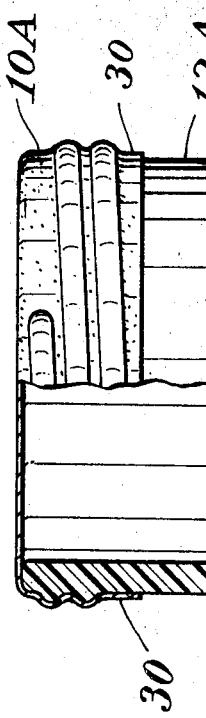

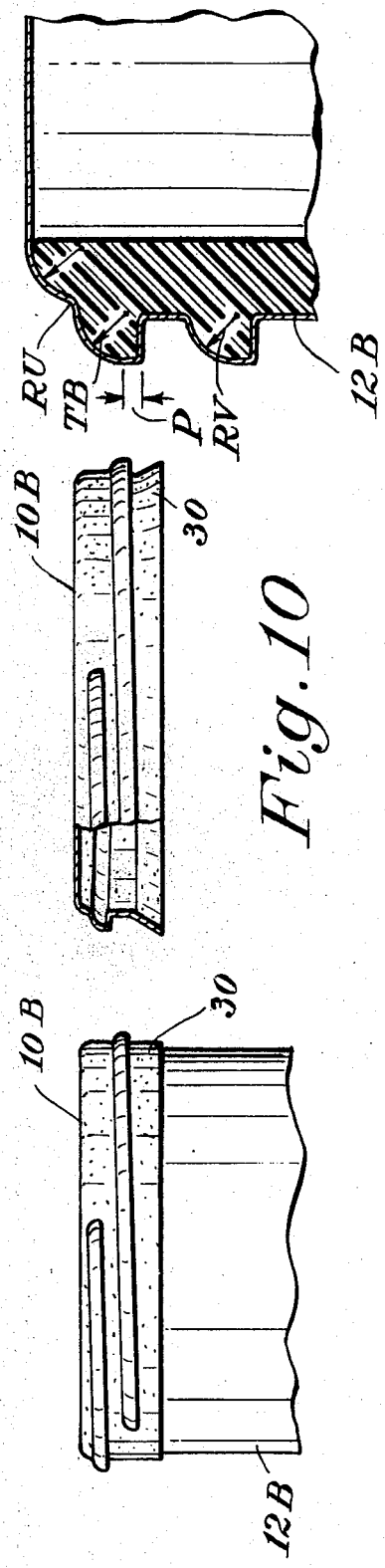

United States Patent Office 3,517,848
Patented June 30, 1970

3,517,848
FOIL CLOSURE FOR PLASTIC CONTAINERS
William C. Kesler, Baltimore, and Joseph W. Ermer, Jr., Lutherville, Md., assignors to Crown Cork & Seal Company, Inc., Philadelphia, Pa., a corporation of New York
Filed Apr. 17, 1968, Ser. No. 722,112
Int. Cl. B65d 41/04, 41/10
U.S. Cl. 215—43
2 Claims

ABSTRACT OF THE DISCLOSURE

A screw-off tamper-proof foil closure for plastic milk bottles and like containers. During sealing or capping of the bottle, the skirt of the foil closure cap is pressed against the threaded neck of the bottle to form internal threads and to form below the lowermost thread a locking ring or band precluding accidental dislodgment of the closure during transport or handling of the closed bottle. For initial access, the user unscrews the cap; the locking ring is progressively flared out during the unscrewing, and is removed intact. Prior opening or tampering is indicated by such flared state of the locking band. The foil cap can be reused by the rescrewing or snapping it onto the neck; in either case, the cap can be tightened by screwing action.

BACKGROUND OF THE INVENTION

A foil closure cap crimped over the lip of a plastic bottle neck, or over a shoulder on the neck, has proved unsatisfactory because, inter alia, it may pop off during shipment or handling; it is somewhat difficult for the user to remove without spillage; and, as reapplied, cannot be suitably tightened.

Preformed screw caps previously used with plastic bottles having glass-type screw threads are too expensive and require feed hoppers which are banned in many areas by local and/or State health departments. Moreover, such caps are not tamper-proof and require that the necks to be made within close tolerances which are difficult to maintain with blow-molding techniques for example.

SUMMARY OF THE INVENTION

In accordance with the present invention, the neck of the plastic bottle, as molded, has a protruding thread of coarse pitch, for example 10 or 12 per inch, and of few turns, such as one or two overlapping turns. In the preferred thread, the turn outline from and back to the neck is latch-shaped having a convex upper face and a flat lower face substantially perpendicular to the neck.

The closure is made from a foil disc coated with plastic or, preferably bonded to a plastic-impregnated paper. As shaped into a crown cap with a flared unthreaded skirt, the closure is disposed, coated side innermost, on the top of the open neck of a filled container. After filling of the container, the top of the cap is pressed firmly against the top of the neck and the skirt is pressed downwardly and inwardly to force the skirt into tight conformity with the neck, so providing the applied closure with internal threading, matching that of the neck, and also with a locking band below all threads. The closure so formed is tight despite dimensional variations of nominally similar necks and, because of the locking band, remains tightly in place despite distortion of the container during shipment and handling. In unscrewing of the cap for initial access to the container contents, the locking band is progressively spread by its engagement with the end of the lowermost thread and remains an integral part of the removed closure. A flareout of the locking band warns a prospective customer that the container has been subjected to tampering. The closure may be reapplied to provide a tight closure for the container either by rescrewing onto the neck or by snapping it onto the neck and then twisting it in rescrewing direction.

BRIEF DESCRIPTION OF THE DRAWINGS

A more detailed understanding of the invention may be had from the following description of embodiments thereof and to the attached drawings in which:

FIG. 4 is a front elevational view of an applied tamper-proof reusable closure embodying the invention;

FIG. 5 is similar to FIG. 4 with part of the closure and neck broken away for explanatory purposes;

FIG. 6 is a front elevational view, partly in section, of the closure of FIGS. 4, 5 as removed from the neck;

FIG. 7 is a sectional view showing the neck-thread contour of FIG. 5 on enlarged scale;

FIG. 8 is a detail sectional view similar to FIG. 7 but showing the preferred neck-thread contour and the resultant threads of the applied closure;

FIG. 9 is a front elevational view of the preferred closure; and

FIG. 10 is a front elevational view, partly in section, of the closure of FIGS. 8, 9 as removed from the neck.

DESCRIPTION OF PREFERRED EMBODIMENTS

In advance of arrival at a capping station, a foil closure cap 10 having a flared unthreaded skirt 11 is loosely positioned on the top of the threaded neck 12 of a previously filled milk bottle 13 or like container. The inner face of foil cap 10 may be and usually is a plastic coated paper and may be stamped as a disc from a strip of the stock. The plastic-impregnated paper is on the inside face of the foil crown cap 10 shaped from the disc blank and so engages the lip of the neck 12 when the cap is applied. For a concurrent description of a preferred method of applying cap 10 and of a capping mechanism suited for doing so, reference is made to FIGS. 1 to 3.

Figure 2:
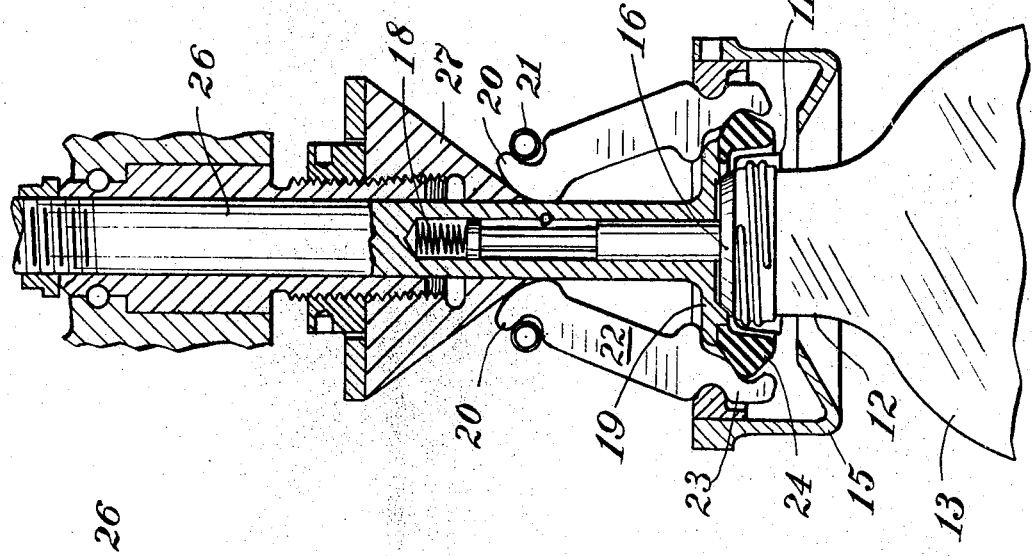
Figure 1:
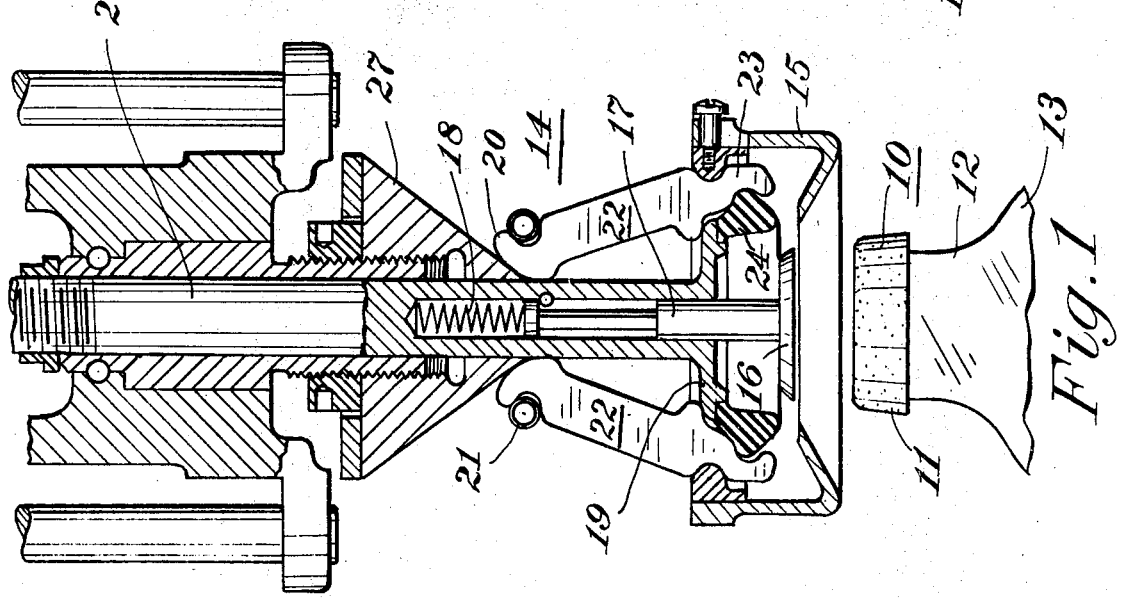

As the container 13 is pushed upwardly from the position shown in FIG. 1 to that of FIG. 2, it enters guide bell 15 of the capping mechanism 14. The top of foil cap 10 is engaged by the centering head 16 at the lower end of spring-biased plunger 17 and is pressed firmly by spring 18 against the top or lip of the neck 12. At this time, the upper arms 20 of sealing segments 22, as biased by garter spring 21, remain in retracted position shown.

The lower arms 23 of the multiplicity of sealing segments jointly embrace the outer circumference of sealing ring 24 of rubber or the like suitably held to the under side of jaw plate 19. The sealing segments 22, intermediate their ends, are effectively pivoted at points 25.

Figure 3:
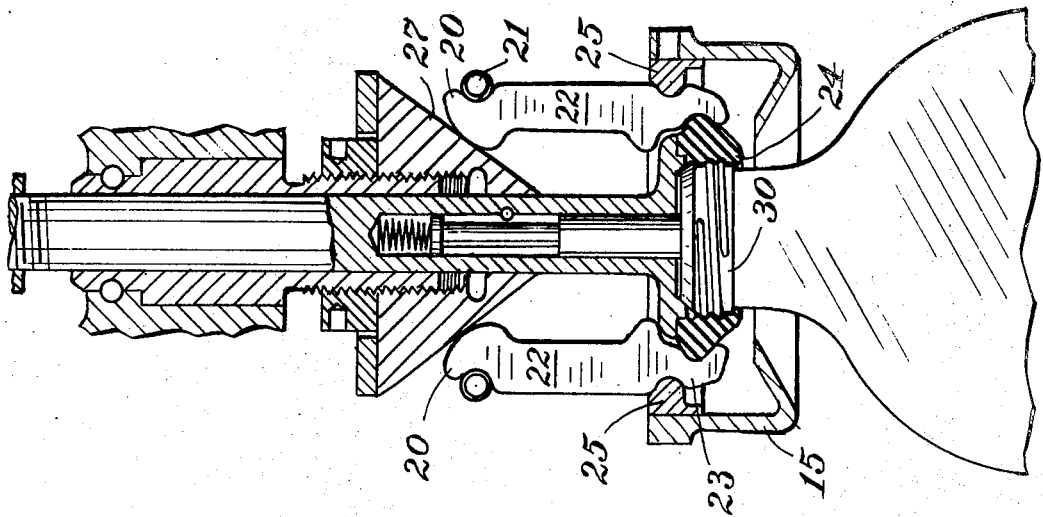
FIGS. 1 to 3 illustrate successive steps of a method for producing a screw or closure on a bottle neck and mechanism suited to do so.

As container 13 moves upwardly from the position shown in FIG. 2 to that of FIG. 3, it lifts the jaw plate 19 and its guide shaft 26. The upper arms 20 of the sealing segments are rocked outwardly by the realtively stationary cam cone 27 about their pivots 25. The lower arms 23 of the sealing segments accordingly force the flexible compressible sealing ring 24 inwardly to draw the skirt 11 of cap 10 over the lip of the threaded neck 12 and to squeeze it tightly into conformity with the neck throughout and below the threaded neck portion. Thus, the skirt 11 of cap 10 as applied is internally threaded and is provided with a locking band or ring 30 below the threading.

Upon withdrawal of the capped container, the parts of the cap mechanism 14 return to their original positions (FIG. 1). It is to be understood that the same capping steps occur if the container remains stationary and the capping mechanism 14 is pushed downwardly and also that such steps may be performed by other mechanisms or by hand.

The applied foil closure 10A of FIG. 4 results when the thread turns of the plastic neck have the contour shown on enlarged scale in FIG. 7. In brief, the arcuate surfaces of the individual turns TA are defined by radius RH centered on the root or neck diameter and by an equal radius RV centered on the outer diameter line of the threads. By way of specific example, the diameter of the plastic neck 12A of FIGS. 4, 5 for a milk bottle is 1.448"±0.10"; the outer diameter of the thread turns is 1.510"±.005"; the radii RH, RV are 0.031"; the lip radius RL is 0.031", and the uppermost turn terminates 0.046" below the neck top. The pitch of the neck threading is 12 per inch and there are 1 to 2 turns. For these neck dimensions, the foil disc from which cap 10A is formed has a dimeter of 1.900" (minimum) to provide a locking band 30 whose lower edge is approximately .032" below the end of the lowermost thread turn.

As shown in FIG. 5, the threads molded into the upper potrion of skirt 11 during application of the cap 10A to the particular plastic container closely conform in contour to the threads of the container neck, and such conformity obtains despite variations of the neck and thread dimensions within tolerance limits of blow-molding techniques. The locking band 30 also tightly engages the neck 12A below the threading despite manufacturing variations of the neck diameter. Because of such locking band, distortion of the container during shipment or handling does not result in pop-off or accidental unscrewing the closure 10A.

When initial access to the container contents is desired, the cap 10A is simply completely unscrewed, and during the unscrewing the lower end of the neck thread progressively cams out the locking band to a flared position such as shown in FIG. 6. The flared band remains as an integral part of the removed cap 10A, FIG. 6, and serves as a centering guide in subsequent reuse of the cap. The removed cap can be reapplied as a temporary closure either by rescrewing it on neck 12A or by snapping it onto the neck. In either case, the cap can be tightened to effect firm engagement with the top of the neck. It is also to be noted that an original purchased is warned of tampering if the locking band appears flared out from the bottle neck. The reasons not fully understood, it has been found that the threaded neck of a plastic bottle, once used to mold a cap to provide internal threading and a locking band, cannot again be used satisfactorily for such purpose unless the neck wall thickness has been intentionally substantially increased for reuse purposes. To that extent, reuse of the container by a competitor is hindered.

The advantages of the invention are more perfectly obtained when the thread turns of the plastic neck are of the special configuration shown in FIG. 8. Outline of the individual turns is not symmetrical as in FIG. 7. Instead, only the upper surface is a convex arc; the lower surface is flat and substantially perpendicular to the neck. Specifically and preferably, the convex upper surface is an arc of about 90° and merges with a flat surface or plateau parallel to the neck and defining the outer thread diameter. This land abruptly drops away to the neck diameter at which dimension the threading contour remains between the thread turns for a distance substantially exceeding the base thickness of a thread turn. By way of specific example, the diameter of the threaded upper portion of the plastic neck 12B of FIG. 9 for a plastic milk bottle is 1.448"±.010"; the outer diameter of the thread turns is 1.510"±.005"; the neck diameter immediately below the threading is substantially less than the outer thread diameter; the radius RU is .033"; the width of plateau P is about .010"; the radius of the fillets is about .015"; and the radius of the lip is about 0.046". The pitch of the neck thread is 10 per inch, and there are 1 to 2 turns. For these neck dimensions, the original foil disc from which cap 10B is formed has a diameter of 1.900" (minimum) so that the skirt 11B of the applied cap 10B (FIG. 9) has a minimum overall width of about .032" for the locking band 30. In the preferred method of forming cap 10B about the plastic bottle neck 12B, the forming pressure has both longitudinal and radial components. The longitudinal component is effective to obtain close conformity between the upper convex surface of the neck thread and the complementary concave surface of the foil thread and to draw the foil tightly to the lip of the neck and to the neck plateaus; the radial pressure flattens the foil against the neck turn plateaus, draws the foil toward and hooks it under the flat lower surface of the neck thread turns, and flattens the coil against the neck between the thread turns and below the lowermost turn. The latching of the foil below each neck thread turn supplements the locking band 30 in preventing pop-off of the cap 10B when the container is dropped during handling or shipment. Accidental loosening or unscrewing action, otherwise possibly occurring during transport or shipment of the container, is precluded by blocking action of the locking band 30 at and below the lowest neck turn.

Again, when initial access to the container is desired, the foil cap 10B is simply unscrewed. Concurrently with the first unscrewing action, the bottom end of the lowermost neck turn progressively pushes out the locking band 30 to the flared position shown in FIG. 10 to clear the neck threads. The flared band 30 remains as an integral part of the removed cap 10B (FIG. 10) to serve as a centering guide in subsequent reapplication of the cap to the container for temporary storage purposes. This closure modification also can be reapplied either by rescrewing it onto the neck 12B or by snapping it over the top thereof. In either case, the closure can be tightened for firm sealing engagement between the top of the neck and the inside of the cap by a screwing motion. A flared-out skirt warns a prospective purchaser that the closure has been tampered with and that consequently the container contents are suspect. Also reuse of the container by a competitor is unlikely because of its impaired ability again to serve as a thread molding die for a similar cap closure.

What is claimed is:

1. A combination of a plastic container and a tamper-proof screw-off foil cap, said container having a neck with a circular outside surface portion thereof extending downward an axial distance therealong beginning at the neck's end, said circular outside surface portion having a smooth surface of substantially uniform radius of curvature therealong except for an external thread protruding therefrom and extending at least once therearound, said cap having a top extending across the end of said container neck and having a skirt tightly engaging said circular outside surface portion thereof over an axial distance therealong sufficient to cover and extend beyond said thread, the portion of said cap beyond said thread being expandable into a flare as the cap is first removed from said neck by unscrewing.

2. The combination of claim 1 in which the external thread of the neck and the internal thread of the cap have in outline upper convex surfaces in engagement and flat lower surfaces in engagement.

References Cited

UNITED STATES PATENTS 3,323,670 6/1967 Flack.
3,335,891 8/1967 Bailey.

GEORGE T. HALL, Primary Examiner

U.S. Cl. X.R.

215—39